US012623565B1

(12) United States Patent
Rois-Mendez

(10) Patent No.: US 12,623,565 B1
(45) Date of Patent: May 12, 2026

(54) STANDALONE HARDWARE BASED METHOD AND APPARATUS FOR EFFICIENTLY CHARGING MULTIPLE ELECTRIC VEHICLES FROM A SINGLE POWER LINE USING TIME-CONTROLLED ALLOCATION FOR POWER DISTRIBUTION WITHOUT THE NEED OF SOFTWARE BASED SMART DEVICES

(71) Applicant: Ernesto Rois-Mendez, Dallas, TX (US)

(72) Inventor: Ernesto Rois-Mendez, Dallas, TX (US)

( * ) Notice: Subject to any disclaimer, the term of this patent is extended or adjusted under 35 U.S.C. 154(b) by 12 days.

(21) Appl. No.: 19/084,559

(22) Filed: Mar. 19, 2025

Related U.S. Application Data

(60) Provisional application No. 63/570,856, filed on Mar. 28, 2024.

(51) Int. Cl.
| | |
|---|---|
| *H02J 7/00* | (2006.01) |
| *B60L 53/62* | (2019.01) |
| *B60L 53/67* | (2019.01) |
| *H02J 7/14* | (2006.01) |

(52) U.S. Cl.
CPC .............. *B60L 53/67* (2019.02); *B60L 53/62* (2019.02); *B60L 2240/80* (2013.01)

(58) Field of Classification Search
CPC ....... B60L 53/67; B60L 53/62; B60L 2240/80
USPC ........................................ 320/109
See application file for complete search history.

(56) References Cited

U.S. PATENT DOCUMENTS

| | | | | |
|---|---|---|---|---|
| 5,548,200 | A * | 8/1996 | Nor ......................... | B60L 53/11 320/132 |
| 5,765,656 | A * | 6/1998 | Weaver ................... | B60L 53/11 180/65.265 |
| 2008/0039980 | A1 * | 2/2008 | Pollack ................... | B60L 53/68 700/295 |
| 2010/0156355 | A1 * | 6/2010 | Bauerle ............. | H02J 7/007194 320/152 |
| 2010/0283426 | A1 * | 11/2010 | Redmann .............. | B60L 3/0069 320/109 |
| 2011/0175569 | A1 * | 7/2011 | Austin ................... | B60L 53/126 320/109 |
| 2013/0057210 | A1 * | 3/2013 | Nergaard ................ | B60L 53/11 320/109 |
| 2014/0111139 | A1 * | 4/2014 | Chen ....................... | H01F 38/42 336/170 |
| 2014/0174870 | A1 * | 6/2014 | Niizuma ................. | B60L 53/32 191/10 |
| 2016/0352113 | A1 * | 12/2016 | Zhao ....................... | B60L 53/14 |
| 2017/0158067 | A1 * | 6/2017 | Reynolds ................ | B60L 53/63 |
| 2019/0193584 | A1 * | 6/2019 | Chen ........................ | H02J 7/34 |

(Continued)

*Primary Examiner* — Alexis B Pacheco

(57) ABSTRACT

A self-contained hardware apparatus and method that enables proprietors to efficiently manage and allocate electric power from a designated source using timer-driven switches and electric breakers, to distribute power to charge multiple electric vehicles of all types and sizes, including land, water, or aerial vehicles, across diverse locations, without relying on software-driven communication or wireless connectivity, thereby eliminating the need for third-party equipment or subscriptions. It optimizes surplus power from the source, utilizing timers and switches to divide it into multiple transmission cables. Each cable delivers power at specified voltage and amperage levels to individual charging units, ensuring efficient and tailored charging without the need to share physical charging spaces.

19 Claims, 1 Drawing Sheet

(56) References Cited

U.S. PATENT DOCUMENTS

| | | | | |
|---|---|---|---|---|
| 2020/0204056 A1* | 6/2020 | Featherly | ............... | H02J 7/1438 |
| 2020/0372143 A1* | 11/2020 | Hirsch | .................... | B60L 53/60 |
| 2022/0410757 A1* | 12/2022 | Gottlieb | ................. | B60L 53/67 |
| 2025/0112475 A1* | 4/2025 | Malik | .................... | B60L 53/60 |

* cited by examiner

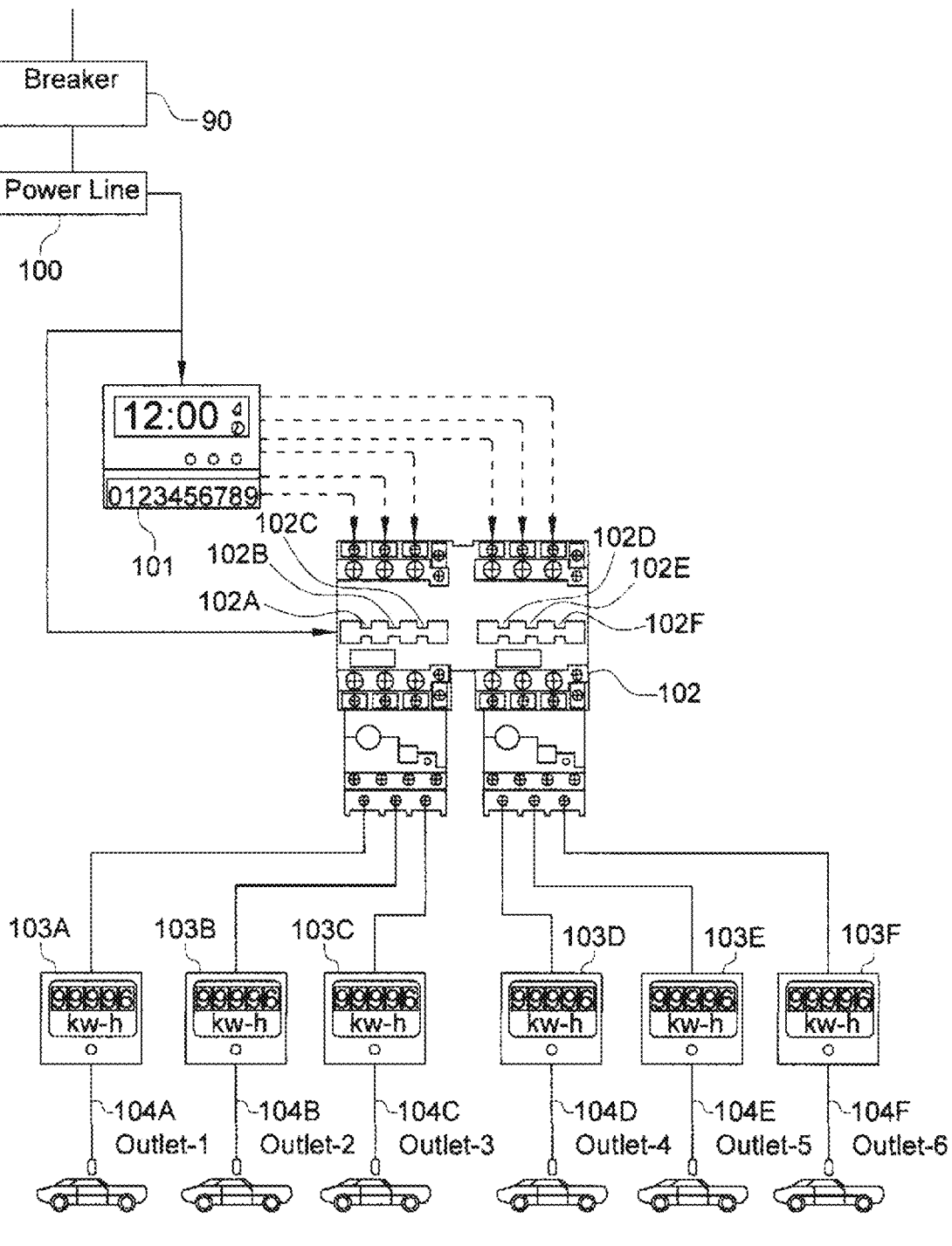

1

STANDALONE HARDWARE BASED METHOD AND APPARATUS FOR EFFICIENTLY CHARGING MULTIPLE ELECTRIC VEHICLES FROM A SINGLE POWER LINE USING TIME-CONTROLLED ALLOCATION FOR POWER DISTRIBUTION WITHOUT THE NEED OF SOFTWARE BASED SMART DEVICES

CROSS-REFERENCE TO RELATED APPLICATIONS

The application claims the benefit of priority from U.S. provisional application No. 63/570,856, filed Mar. 28, 2024, which application is hereby incorporated by reference for all purposes.

TECHNICAL FIELD

The present invention relates to a novel method of distributing the electrical power from a single power source cable to supply the required current to power several electric vehicle charging devices without the need to share the charging space physical location, and without dependency of smart software driven devices. More particularly the invention relates to a standalone method, independent of smart software-driven devices, of sharing the power to charge several electric vehicles, instead of sharing the physical space in which they are to be charged, while multiplying by several times the number of vehicles that can be charged from a single charging power line.

The process entails channeling power from a single electric cable (referred to as the primary power line) and redirecting it to multiple secondary cables to power various electric vehicle charging devices (referred to as secondary power lines). This distribution is facilitated through programmable time management power switching, which dictates the timing, duration, and amperage to be allocated to each secondary power line. Consequently, based on the allotted charge time for each secondary line, the approach would increase the capacity to charge several vehicles from a single power line by many fold, and it would eliminate the need for electric vehicles to share with others the physical space it requires for charging. Of course, the number of vehicles would depend on the charge time.

BACKGROUND

Electric Vehicles (EVs), spanning across land, water, and aerial transportation, both human-driven and self-driving, have firmly established their presence and are continuously gaining traction within their respective market sectors. However, widespread acceptance is impeded by the challenge of accessing convenient and dependable fast-charging stations, which are essential to make the vehicle a practical method of transportation.

Many cities across the USA and globally are introducing new construction regulations mandating the inclusion of adequate electrical infrastructure in new buildings to accommodate the anticipated rise in electric vehicle usage and the need for accessible charging facilities. Nonetheless, existing building infrastructure lacks the capacity to support the anticipated demand, presenting significant financial burdens and challenges in retrofitting to accommodate electric vehicles.

In numerous instances, it proves technically infeasible and/or economically unviable to equip existing buildings with additional electrical capacity.

Power companies, regulatory agencies, and members of the electric vehicle industry have raised considerable concerns regarding the potential necessity to augment the production capacity of electric power companies to align with the escalating demand for electric vehicles.

Indeed, the reality is that a vast majority of existing building infrastructure possesses ample spare electrical capacity to fulfill either the entirety or a significant portion of their occupants' electric vehicle power needs. However, achieving this requires effective time management in the utilization of available power resources. Essentially, not all vehicles belonging to occupants can be charged simultaneously or within a fixed charging window.

Electric vehicle manufacturers and government agencies have dedicated significant resources and investment towards the development of an EV charging infrastructure, aiming to meet the demands of EV operators. However, their focus has primarily centered on establishing public EV charging stations intended for use by a wide range of users. This approach, while useful and necessary, remains a problematic reality for electric vehicle owners and operators, representing a necessary inconvenience.

Sharing physical EV charging spaces, although beneficial, presents numerous challenges. It is highly cumbersome, exceedingly inconvenient, and time-consuming. Moreover, it leads to a plethora of issues, including hindering the demand for electric vehicles due to the inadequacy and awkwardness of the charging infrastructure.

Several companies have devised methods to facilitate power sharing among multiple electric vehicle users by allowing them to share charging spaces. However, this approach necessitates users to relocate their vehicles from the charging space once they are fully charged, enabling others to utilize the space. While this strategy is undoubtedly advantageous, it poses significant inconveniences for users, generates various problems, and results in excessive idle occupancy of the charging space. Consequently, the utilization of available power becomes highly inefficient as vehicles unnecessarily occupy charging spaces even after reaching full charge. This inefficiency is particularly pronounced in settings such as apartments, condominiums, malls, manufacturing plants, office spaces, and entertainment centers where tenants do not anticipate using the charging space for short periods.

Other companies have directed efforts towards high-tech methods of sharing limited power resources without necessitating the sharing of physical space. In these efforts, they employ smart electronic devices driven by sophisticated software that facilitates communication and manages the allocation of time and amperage for each user. While this approach is practical and user-friendly in some settings, it requires users to commit to a specific service provider for power supply and equipment, as well as adhere to a set of rules, regulations, and additional expenses associated with subscription. Consequently, users become subject to the terms and conditions imposed by a particular company, sacrificing some of the cost-saving benefits typically associated with electric vehicles.

Indeed, electric vehicle owners and operators express a strong preference for and expectation of conveniently accessible charging capabilities that are not publicly shared. There is a long-felt but unmet need for dependable charging infrastructure in locations where they spend extended periods, such as at home, work, or any place where they spend considerable time.

Ideally, electric vehicle (EV) owners and operators would prefer the convenience of charging their vehicles at home or work or in the places they spend their time, without the hassle of having to relocate their vehicles every few hours to accommodate the next user in line.

When it comes to electric vehicle charging, the optimal utilization of existing available power involves maximizing the continuous use of charging capabilities to accommodate as many vehicles as possible. However, from the perspective of electric vehicle operators, the ideal charging method entails the freedom to charge in preferred spaces, such as at home or in the office, without the need to share the charging space with others. They desire the flexibility to charge at their convenience, whether it be at specific times of the day or on preferred days of the week, without being subjected to third-party demands, equipment, software-based communication devices, or costly subscription service charges. Instead, they simply wish to pay for the electric power consumed. This could be achieved by distributing available power to the physical spaces where users prefer to charge their vehicles and managing charging times and days according to user preferences.

Implementing the aforementioned approach would diminish the necessity for increasing power production by mitigating the requirement to introduce additional power to existing building infrastructure. This would enhance power utilization efficiency, bolster public interest and acceptance of electric vehicles, contribute to environmental cleanliness, optimize the utilization of the existing EV charging network, and curtail future investments in public electric charging infrastructure. Ultimately, it would render electric vehicles a more practical transportation alternative.

The electrical capacity of existing multi-tenant buildings in the United States typically contains enough spare power to fulfill approximately 5 to 10% of their tenants' electric vehicle (EV) charging requirements. However, through effective time management, this power capacity could potentially cater to the EV charging needs of 30 to 60% of their tenants.

In the case of automobiles, the average person in the US drives their vehicle for less than 40 miles per day. A typical Level 2 EV charger (operating at 208-240 volts and 50-60 amps) can charge at a rate of 14 to 35 miles per hour. This implies that on the average, an EV's daily electric power consumption could be replenished within approximately one to two hours of charging per day.

If every spare power line equipped with Level 2 charging capability were utilized for 12 hours daily instead of just two, and then left idle, the charging capacity of each line would increase by a factor of 6. Consequently, a building with the capacity to accommodate the charging needs of 8% of its tenants could readily enhance its capacity to serve nearly 50% of its tenants.

The aforementioned objectives can be achieved through the invention described in this document, hereinafter referred to as "EV Power Router".

SUMMARY OF THE INVENTION

The current electric vehicle (EV) charging methods primarily involve either connecting an EV charging device directly to a primary power line to serve a single user, or, for multiple user scenarios, distributing power in one of two ways:

1) A dedicated primary cable linked to a single charging device situated in a specific physical location, shared among multiple users who rotate their vehicles in and out of the charging space to accommodate the next user.

2) A primary power cable is divided into several secondary power cables transmitting electricity to various physical locations. These locations share available power by managing power transmission through software-based power management systems, designed to prevent potential over-demand, power tripping, or outages. This method necessitates costly smart charging devices that communicate with each other to determine when and which secondary power lines receive power. However, these devices are costly and controlled by manufacturers or service providers, thereby increasing charging costs for users due to associated fees requiring the users to depend solely on them for their charging needs. In a way, these companies monopolize the control of the user's charging devices and increase the cost of charging the vehicles.

The present invention introduces a novel, simpler, more efficient, highly reliable, standalone, owner-controlled, and economical method of sharing limited power resources among multiple users without the need to physically share charging space or rely on software-based power management devices. It eliminates the necessity for wireless connection methods like Wi-Fi or Bluetooth. Additionally, it grants proprietors complete independence to manage power usage levels, charging times, and days of the week for each EV charging device without committing to any third-party company for control or management, incurring additional expenses, or subscribing to any services.

In one embodiment, the invention provides a self-contained hardware-only system for controlling and distributing electrical power from an end-use circuit protected by a breaker to only one at a time of at least two charging outlets to which an electric vehicle can be connected for charging, having a timer-driven switch for connecting the end-use circuit through the breaker to a first of the at least two charging outlets for a first predetermined time period beginning at a first predetermined start time and continuing for a predetermined connection period and, substantially immediately thereafter, by connecting the end-use circuit through the breaker to a second of the at least two charging outlets for a second predetermined time period beginning substantially immediately after the end of the first predetermined connection period, the first and second connection periods occurring at non-overlapping times in the same 24 hour period, and when there are more than two charging outlets to which an electric vehicle can be connected for charging, the timer-driven switch is configured to connect the end-use circuit through the breaker to only one of the more than two charging outlets at a time, each for a predetermined connection period occurring at non-overlapping times periods in the same 24 hour period.

In an aspect of this embodiment, the non-overlapping time periods have an aggregate length of time substantially equal to 24 hours.

In another aspect of this embodiment, the self-contained hardware-only system does not rely upon software-driven communication devices, wireless connectivity, or third-party equipment or subscriptions.

In another aspect of this embodiment, each of charging outlets is located adjacent a parking space that accommodates only one electric vehicle at a time.

In another aspect of this embodiment, an electric power consumption meter records electric power consumption separately for each connection period.

In another aspect of this embodiment, the timer-driven switch has a mechanical timer.

In another aspect of this embodiment, the timer-driven switch has a mechanical switch.

In yet another aspect of this embodiment, the timer-driven switch has both a mechanical timer and a mechanical switch.

In a second embodiment, the invention provides a self-contained hardware-only method for controlling and distributing electrical power from an end-use circuit protected by a breaker to only one at a time of at least two charging outlets to which an electric vehicle can be connected for charging, comprising providing a timer to control a switch to connect the end-use circuit through the breaker to a first of the at least two charging outlets for a first predetermined time period beginning at a first predetermined start time and continuing for a predetermined connection period, and substantially immediately thereafter, using the timer-controlled switch to connect the end-use circuit through the breaker to a second of the at least two charging outlets for a second predetermined time period beginning substantially immediately after the end of the first predetermined connection period, the first and second connection periods occurring at non-overlapping times in the same 24 hour period, and when there are more than two charging outlets to which an electric vehicle can be connected for charging, the timer-controlled switch is restricted to connecting the end-use circuit through the breaker to only one of the more than two charging outlets at a time, each for a predetermined connection period occurring at non-overlapping times periods in the same 24 hour period.

In an aspect of this second embodiment, the non-overlapping time periods have an aggregate length of time substantially equal to 24 hours.

In an aspect of this second embodiment, the self-contained hardware-only method does not rely upon software-driven communication devices, wireless connectivity, or third-party equipment or subscriptions.

In an aspect of this second embodiment, each of charging outlets is located adjacent a parking space that accommodates only one electric vehicle at a time.

In an aspect of this second embodiment, the invention further comprises recording electric power consumption separately for each connection period.

In an aspect of this second embodiment, the timer-controlled switch has a mechanical timer.

In an aspect of this second embodiment, the timer-controlled switch has a mechanical switch.

In an aspect of this second embodiment, the timer-controlled switch has both a mechanical timer and a mechanical switch.

The manner the system works is that a single power line with a voltage range of 110 volts AC to 480 volts AC, and any DC voltage, and adjustable amperage, originating from a circuit breaker panel, is routed to several electric contactors under the control of a timer. These contactors, capable of handling varying capacities depending on the incoming power, actuate upon triggers from a programmable timer to direct power to one at a time of the multiple subsequent lines. Each of these subsequent lines, in turn, supply power to a given EV, for a given timeframe selected by the timer's programming.

The number of contactors would depend on the number of subsequent power lines desired, which would be a function of the timeframe that each end-point power line is destined to nourish power to a EV.

If preferred, each subsequent power line could be equipped with a power consumption meter, enabling the calculation of power usage for individual EV charging along each line.

However, the meters are not required for the proper functioning of the system.

Terminology

EV: Electric vehicles of all kinds, including hybrid powered vehicles, land, water, and aerial vehicles.
Power: AC or DC electric power of customary voltage and amperage capacity levels.
Spare Power: Unutilized electric power capacity that can be derived from an electric breaker panel.
Standalone: Controlled by its proprietor and being independent of third party companies that supply either equipment or services required by the system to work.

BRIEF DESCRIPTION OF THE DRAWINGS

The FIGURE describes the method in which the Switching and Metering Panel works by receiving power from a single line and distributing the power one at a time to multiple subsequent power lines.

DETAILED DESCRIPTION

The FIGURE depicts an exemplary implementation of the invention that will help in understanding of the invention. In the FIGURE, the diagram depicts an example of how a main power line 100 originating from a breaker 90 of an electric breaker panel box (not shown) is routed to six electric contactors 102A, 102B, 102C, 102D, 102E, and 102F, each contactor being actuated (to permit flow of power) and de-actuated (to prevent flow of power) by timer 101. These contactors, capable of handling varying capacities depending on the incoming power, actuate upon triggers from a programmable timer 101 to direct power in sequence to one at a time of six subsequent power lines 104A, 104B, 104C, 104D, 104E, and 104F. Each of these subsequent lines 104A, 104B, 104C, 104D, 104E, and 104F, in turn, supply power to a given single EV at a time, for a given timeframe selected by the timer's programming, while the other contactors remain de-activated. At the end of the given timeframe, the line 104A, 104B, 104C, 104D, 104E, or 104F feeding its EV at a time, is deactivated from its respective contactor 102 A, 102B, 102C, 102D, 102E, or 102F, under the control of timer 101. Essentially immediately thereafter, that the activated one of lines 104A, 104B, 104C, 104D, 104E, or 104F is deactivated, and immediately thereafter, a subsequent one of the power lines 104A, 104B, 104C, 104D, 104E, or 104F is activated for another EV. This process then continues, nurturing the charger of one EV at a time from a single power line 104A, 104B, 104C, 104D, 104E, or 104F at a time, for as many power lines 104 to an EV there are. Of course, having six subsequent power lines is just an example; any number of subsequent power lines can be employed, depending upon the desired number of EV's to be accommodated. Although not required, respective power consumption meters 103A, 103B, 103C, 103D, 103E and 103F can be added to one or more of the power lines 104A, 104B, 104C, 104D, 104E, or 104F.

In this scenario, there are six cables connected to each EV Power Router Switching and Metering Panel. The power distribution, controlled by the timer, is organized so that each EV charging cable receives power at a different and preset programmable time period of the day and/or specific days of the week to prevent power overlapping, and to ensure that the power does not overload the system. Depending on the anticipated utilization timeframe for each EV charging cable, the number of cables—and consequently, the number of vehicles that can be charged—can be adjusted accordingly, either increased or decreased.

The present invention requires no software-driven connectivity between its outlets to either manage time or for power allocation. Therefore, no wi-fi or other form of connectivity is needed for that purpose. However, the timers could be programed either in the unit itself, or through a phone application. When using a phone application, for example, wi-fi or Bluetooth connectivity will be needed for programming purposes only, not for the system's proper functioning.

The system is designed to operate without requiring software-driven connectivity between its outlets for time management or power distribution. As such, no Wi-Fi or other connectivity is necessary for these functions. However, some types of timers can be programmed either directly on the unit or via a mobile application. As such, the system may use a timer that requires phone application programming, using a mobile app. If using the mobile app, however, Wi-Fi connectivity will be used only for programming purposes, not for the system's overall functionality during operation to charge EVs.

The power distribution method will be applicable to power ranges of 110v to 480v AC and any range of DC power. It will also be applicable for all ranges of commercially used amperage.

The invention is applicable for all types of electric vehicle charging, including land, water, and air electric vehicles, human-driven, self-driving and remotely-driven. The system and method of the invention can be applicable for charging any battery-driven device, or simply just batteries, not necessarily vehicles.

The timer can be mechanical or electrical, analog or digital. It is also important to note that the type of timer used may vary depending on the specific application of the device. Some timers will not allow overlapping charging periods for the outlets, while others will. When using a timer that permits overlap, the timer must be configured during set up or programming to prevent scheduling overlaps.

What is claimed is:

1. An AC power delivery system for controlling and distributing AC electrical power from an end-use circuit protected by a breaker to only one at a time of at least two charging outlets to which an electric vehicle can be connected for charging that, once initially set-up prior to delivery of AC power, does not rely upon software-driven communication devices, wireless connectivity, or third-party equipment or subscriptions for controlling sequential delivery of AC power to multiple electric vehicle charging outlets comprising:

a breaker-protected power input for receiving AC electric current from a source;

a plurality of AC power outlets; and timer-controlled switches to sequentially connect the power input to only one power outlet at a time and only at predetermined times by presetting different time periods of the day and/or on specific days of the week for each power outlet, each of the outlets being connected by its own power cable running directly to the switch or one of the switches, whereby the apparatus allocates AC current to the outlets one at a time to distribute AC power to different ones of the electric vehicles for preset non-overlapping time periods.

2. The apparatus of claim 1, wherein the respective time periods have an aggregate length of time essentially equal to 24 hours per day.

3. The apparatus of claim 1, wherein, once initially set-up prior to delivery of AC power, the AC delivery system operates independently of software-based communication devices, wireless connectivity, cloud/servers, network connectivity, charger-to-charger electronic communication, or third party cloud/software services to allocate power.

4. The apparatus of claim 1, wherein, once initially set-up and prior to delivery of AC power, each outlet is connected to only a single connecting plug connected by a single power cable for delivery of power to a single electric vehicle at a time.

5. The apparatus of claim 1 wherein one or more of the power outlets includes a meter configured to record electric power consumption separately for the outlet during each sequential energization of the outlet.

6. The apparatus of claim 1, wherein the timer of the timer-controlled switches is a mechanical timer.

7. The apparatus of claim 1, wherein at least one switch of the timer-controlled switches is a mechanical switch.

8. The apparatus of claim 1, wherein the timer of the timer-controlled switches is mechanical and at least one switch of the timer-controlled switches is mechanical.

9. A method for delivery of AC power to multiple electric vehicle charging outlets that, once initially set-up prior to delivery of AC power, does not rely upon software-driven communication devices, wireless connectivity, or third-party equipment or subscriptions, comprising the steps of:

providing a breaker-protected power input for receiving AC electric current from a source;

providing a plurality of AC power outlets; and using timer-controlled switches to sequentially connect the power input to only one power outlet at a time and only at predetermined times by presetting different time periods of the day and/or on specific days of the week for each power outlet, each of the outlets being connected by its own power cable running directly to the switch or one of the switches, whereby the apparatus allocates AC current to the outlets one at a time to distribute AC power to different one of the electric vehicles for preset non-overlapping time periods.

10. The method of claim 9, wherein the respective time periods have an aggregate length of time essentially equal to 24 hours per day.

11. The method of claim 9, wherein, once initially set-up prior to delivery of AC power, the method operates independently of software-based communication devices, wireless connectivity, cloud/servers, network connectivity, charger-to-charger electronic communication, or third party cloud/software services to allocate power.

12. The method of claim 9, wherein each outlet is connectable to only a single connecting plug connected by a single power cable for delivery of power to a single electric vehicle at a time.

13. The method of claim 9 wherein one or more of the power outlets includes a meter configured to record electric power consumption separately for the outlet during each sequential energization of the outlet.

14. The method of claim 9, wherein the timer of the timer-controlled switches is a mechanical timer.

15. The method of claim 9, wherein at least one switch of the timer-controlled switches is a mechanical switch.

16. The method of claim 9, wherein the timer of the timer-controlled switches is mechanical and at least one switch of the timer-controlled switches is mechanical.

17. The system of claim 1, wherein the timer of the timer-controlled switches is an electronic timer.

18. The system of claim 1, wherein at least one switch of the timer-controlled switches is an electronic switch.

19. The apparatus of claim 1, wherein the timer of the timer-controlled switches is electronic and at least one switch of the timer-controlled switches is an electronic switch.

\* \* \* \* \*